(12) United States Patent
Matsubara et al.

(10) Patent No.: US 11,218,098 B2
(45) Date of Patent: Jan. 4, 2022

(54) MOTOR SYSTEM

(71) Applicants: Toyota Jidosha Kabushiki Kaisha, Toyota Aichi-ken (JP); Denso Corporation, Kariya Aichi-pref (JP)

(72) Inventors: Kiyotaka Matsubara, Ichinomiya Aichi-ken (JP); Makoto Nakamura, Okazaki Aichi-ken (JP); Daigo Nobe, Toyota Aichi-ken (JP); Ryuji Omata, Kariya Aichi-pref (JP)

(73) Assignee: Denso Corporation, Kariya (JP)

(*) Notice: Subject to any disclaimer, the term of this patent is extended or adjusted under 35 U.S.C. 154(b) by 155 days.

(21) Appl. No.: 16/360,534

(22) Filed: Mar. 21, 2019

(65) Prior Publication Data
US 2019/0296668 A1 Sep. 26, 2019

(30) Foreign Application Priority Data

Mar. 22, 2018 (JP) .............................. JP2018-055321

(51) Int. Cl.
| | | |
|---|---|---|
| H02P 21/00 | (2016.01) | |
| H02P 21/16 | (2016.01) | |
| H02P 27/12 | (2006.01) | |

(52) U.S. Cl.
CPC .......... *H02P 21/0021* (2013.01); *H02P 21/16* (2016.02); *H02P 27/12* (2013.01)

(58) Field of Classification Search
CPC .... H02P 6/08; H02P 21/22; H02P 6/12; H02P 11/00; H02P 27/06; H02P 2006/045; B60L 15/025; H02M 7/42
USPC .................................. 318/800, 801, 400.02
See application file for complete search history.

(56) References Cited

U.S. PATENT DOCUMENTS

| | | | | |
|---|---|---|---|---|
| 2006/0164028 A1* | 7/2006 | Welchko | ............... | B60L 15/025 318/105 |
| 2014/0152205 A1* | 6/2014 | Nakai | ..................... | H02P 21/05 318/400.02 |
| 2019/0260324 A1* | 8/2019 | Kuramitsu | ........... | B62D 5/0484 |

FOREIGN PATENT DOCUMENTS

| | | |
|---|---|---|
| JP | 2000125411 A | 4/2000 |
| JP | 2000324871 A | 11/2000 |
| JP | 2005-045880 A | 2/2005 |
| JP | 2006238686 A | 9/2006 |
| JP | 2008-219956 A | 9/2008 |
| JP | 2010-200527 A | 9/2010 |
| JP | 2010-207030 A | 9/2010 |
| JP | 2013-038970 A | 2/2013 |
| JP | 2015-139341 A | 7/2015 |

* cited by examiner

*Primary Examiner* — Jorge L Carrasquillo
(74) *Attorney, Agent, or Firm* — Dinsmore & Shohl LLP

(57) ABSTRACT

A control unit calculates a motor voltage vector including a corresponding excitation voltage command and a torque voltage command in response to an output request for a motor and distributes the motor voltage vector to a first inverter voltage vector and a second inverter voltage vector while maintaining the motor voltage vector obtained to control modes of operation (PWM, overmodulation, and square wave mode) of a first inverter or a second inverter. The first inverter voltage vector includes an excitation voltage command and a torque voltage command associated with an output from the first inverter, and the second inverter voltage vector includes an excitation voltage command and a torque voltage command associated with an output from the second inverter.

6 Claims, 8 Drawing Sheets

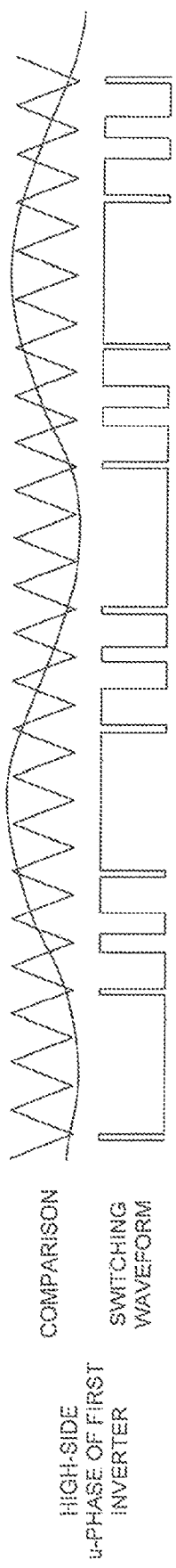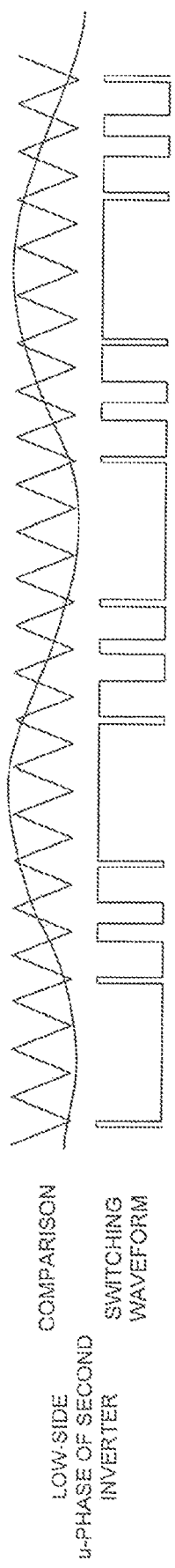

APPLIED VOLTAGE

PHASE CURRENT

MOTOR SYSTEM

CROSS REFERENCE TO RELATED APPLICATION

This application claims priority to Japanese Patent Application No. 2018-055321 filed on Mar. 22, 2018, which is incorporated herein by reference in its entirety including the specification, claims, drawings, and abstract.

TECHNICAL FIELD

The present disclosure relates to a motor system including two power supplies and two inverters. In the motor system, one motor is driven by outputs from the two inverters.

BACKGROUND ART

JP 2000-324871 A discloses a motor system including two power supplies and two inverters. In this motor system, one motor is driven by outputs from the two inverters. In this system, each phase of the star-connected motor includes two windings connected in series. One inverter is connected to a winding end of each phase, and the other inverter is connected to an intermediate point between the windings. Accordingly, it is possible to drive the motor by an output from one inverter, using the two windings (a first drive winding) connected in series and to drive the motor by an output from the other inverter, using the winding disposed in the inner side of the intermediate point (a second drive winding).

Furthermore, JP 2000-125411 A discloses a system including two power supplies, that is, a battery and a fuel cell, and two inverters which are respectively connected to the power supplies. Herein, outputs of the two inverters are respectively connected to both ends of a three-phase coil of one motor. In this system, the two inverters are controlled independently while the battery and the fuel cell are made to have an equal midpoint voltage so as to meet a requirement of output from a motor, changing output from the battery and without changing output from the fuel cell.

In JP 2000-324871 A, an inner winding included in a second drive winding is used in a first drive winding. Herein, basically two separate drive windings are used. An output torque request for a motor is distributed to motor output torque by the first drive winding and motor output torque by the second drive winding so as to reduce motor losses.

In JP 2000-125411 A, because of difficulty in changing an output from a fuel cell, a difference between an output torque request for a motor and motor output torque by the fuel cell is allocated to a motor output by a battery.

As described above, JP 2000-324871 A and JP 2000-125411 A limitedly describe the use of two power supplies and two inverters and do not describe any proposal on effective use thereof.

SUMMARY

A motor system according to the present disclosure includes: a first inverter which converts direct current power from a first power supply into alternating current power, having PWM mode, overmodulation mode, and square wave mode as modes of operation; a second inverter which converts direct current power from a second power supply into alternating current power, having PWM mode, overmodulation mode, and square wave mode as modes of operation; a motor which is driven by the alternating current power from the first inverter and the alternating current power from the second inverter, and a control unit which calculates a motor voltage vector including a corresponding excitation voltage command and a torque voltage command in response to an output request for the motor and distributes the motor voltage vector to a first inverter voltage vector and a second inverter voltage vector while maintaining the motor voltage vector obtained to control the modes of operation of the first inverter or the second inverter, wherein the first inverter voltage vector includes an excitation voltage command and a torque voltage command associated with an output from the first inverter, and the second inverter voltage vector includes an excitation voltage command and a torque voltage command associated with an output from the second inverter.

The control unit may limits an inverter voltage vector of one of the first inverter and the second inverter in magnitude to a predetermined value or less to limit a mode of operation of a target inverter.

When noise is generated, the control unit may limits an inverter voltage vector of one of the first inverter and the second inverter in magnitude to a predetermined value or less to limit a mode of operation of a target inverter to PWM mode.

When the motor is at a high temperature, the control unit may limits an inverter voltage vector of one of the first inverter and the second inverter in magnitude to a predetermined value or less to limit a mode of operation of a target inverter to PWM mode.

When the motor has a voltage vector changing largely, the control unit may limits an inverter voltage vector of one of the first inverter and the second inverter in magnitude to a predetermined value or less to limit a mode of operation of a target inverter to PWM mode.

When one of the first inverter and the second inverter is at a high temperature, the control unit may limits an inverter voltage vector of a high-temperature inverter in magnitude to a predetermined value or more to limit a mode of operation of a target inverter to overmodulation mode or square wave mode.

In the motor system according to the present disclosure provided with two power supplies and two inverters, distribution of outputs from the two inverters is controlled so as to select modes of operation of the inverters and prevent noise or the like.

BRIEF DESCRIPTION OF DRAWINGS

Embodiment(s) of the present disclosure will be described by reference to the following figures, wherein:

FIG. 3A is a diagram illustrating a switching waveform (at a 50:50 distribution ratio) of a high-side switching element of a first inverter;

FIG. 3B is a diagram illustrating a switching waveform (at a 50:50 distribution ratio) of a low-side switching element of a second inverter;

DESCRIPTION OF EMBODIMENTS

Hereinafter, an embodiment of the present disclosure will be described with reference to the drawings. It should be noted that the present disclosure is not limited to the embodiment described herein.

"Arrangement of System"

Figure 1:
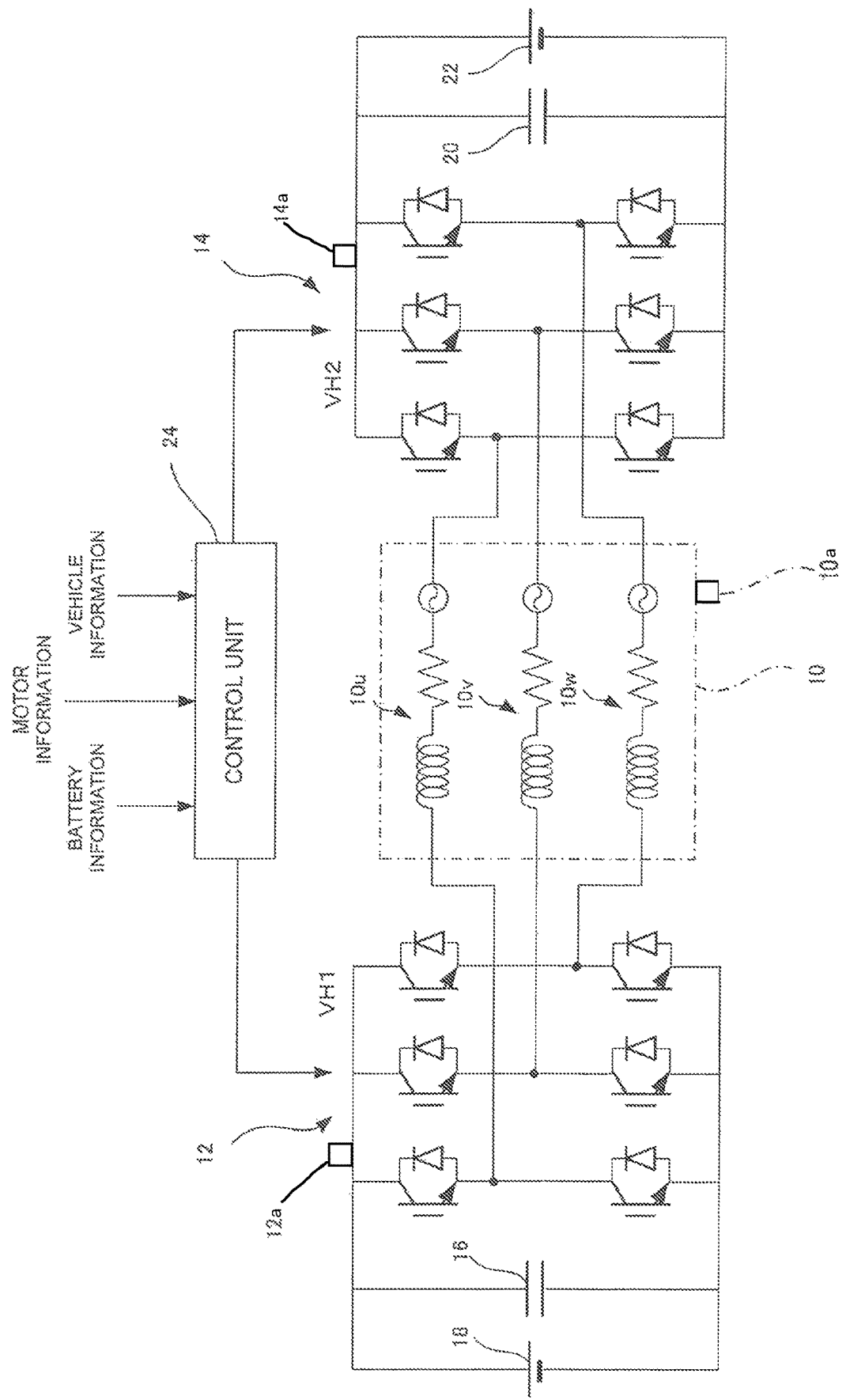
FIG. 1 illustrates a general arrangement of a motor system according to an embodiment.

FIG. 1 illustrates an arrangement of a motor system according to an embodiment. A motor 10 is a three-phase motor, including three-phase coils 10u, 10v, and 10w. Each of the coils 10u, 10v, and 10w includes a reactor component, a resistance component, and an induced electromotive force (back electromotive force) component, and those components are illustrated in the drawing as being connected to the coil in series. The system is assumed to be mounted on a vehicle, and the motor 10 is assumed to be a motor that generates a driving force for running the vehicle.

Each of the three-phase coils 10u, 10v, and 10w has one end connected to a first inverter 12 that converts direct current power to alternating current power, and each of the three-phase coils 10u, 10v, and 10w has the other end connected to a second inverter 14. In addition, to the first inverter 12, a first capacitor 16 and a first battery 18 are connected in parallel, and to the second inverter 14, a second capacitor 20 and a second battery 22 are connected in parallel. In this example, the first battery 18 and the second battery 22 are employed as a first power supply and a second power supply, but electric storage devices such as capacitors may also be employed.

The first inverter 12 and the second inverter 14 are arranged in a similar manner, including three (three-phase) arms, each of which includes two switching elements connected in series. Herein, an intermediate point of the arm in each phase is connected to a corresponding phase of the coils 10u, 10v, and 10w. Accordingly, at the time of powering, power from the first battery 18 is supplied to the motor 10 through the first inverter 12, and at the time of regeneration (power generation), power from the motor 10 is supplied to the first battery 18 through the first inverter 12. The second inverter 14 and the second battery 22 also exchange power with the motor 10 in a similar manner.

In each switching element, a transistor such as an IGBT (Insulated Gate Bipolar Transistor) and a backward diode are connected in parallel. When a high-side transistor is turned on, a current flows toward a corresponding phase coil, and when a low-side transistor is turned on, a current is withdrawn from a corresponding phase coil.

A control unit 24 produces switching signals for the first inverter 12 and the second inverter 14 based on battery information, motor information, vehicle information, and the like so as to control switching of those inverters.

"Arrangement of Control Unit"

Figure 2:
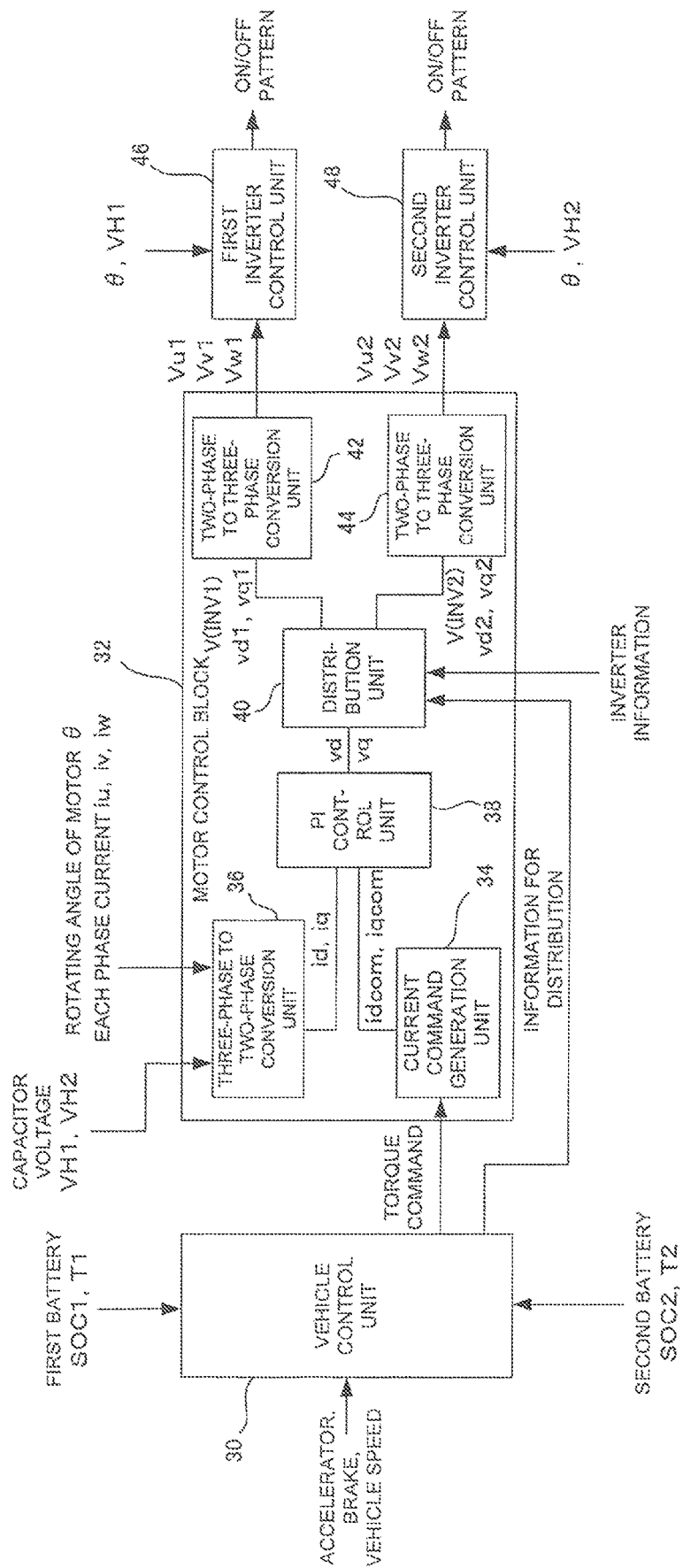
FIG. 2 is a diagram illustrating an arrangement of a control unit.

FIG. 2 illustrates an arrangement of the control unit 24. A vehicle control unit 30 receives information associated with a running vehicle, for example, control inputs of an accelerator pedal and a brake pedal and a vehicle speed, and receives battery information such as states of charge of the first battery 18 and the second battery 22 (SOC1 and SOC2) and temperatures of the first battery 18 and the second battery 22 (T1 and T2). Navigation information such as road conditions and destinations may be also be supplied to the vehicle control unit 30.

The vehicle control unit 30 calculates a torque command in regard to an output request (target output torque) for the motor 10 based on, for example, the control inputs of the accelerator pedal and the brake pedal.

The calculated torque command is supplied to a current command generation unit 34 of a motor control block 32. Based on the torque command, the current command generation unit 34 calculates a d-axis current idcom and a q-axis current iqcom which are target current commands in vector control of the motor 10. A capacitor voltage VH1 of the first capacitor 16 and a capacitor voltage VH2 of the second capacitor 20, a rotor rotating angle θ of the motor 10, and each of phase currents iu, iv, and iw at the moment are supplied to a three-phase to two-phase conversion unit 36. The three-phase to two-phase conversion unit 36 converts each of the detected phase currents iu, iv, and iw into a d-axis current id and a q-axis current iq. The target current commands (d-axis and q-axis currents) idcom and iqcom from the current command generation unit 34 and the d-axis current id and the q-axis current iq from the three-phase to two-phase conversion unit 36 are supplied to a P1 control unit 38, and a motor voltage vector V (d-axis excitation voltage command vd and q-axis torque voltage command vq) is calculated. The P1 control unit 38 calculates a voltage command (motor voltage vector V (vd and vq)) by feedback control such as P (proportional) control and I (integral) control. Note that the feedback control may be carried out in combination with feedforward control such as predictive control.

The calculated motor voltage vector V (voltage commands vd and vq) is supplied to a distribution unit 40. The distribution unit 40 distributes the motor voltage vector V (voltage commands vd and vq) to a first inverter voltage vector V (INV1) (voltage commands vd1 and vq1) for the first inverter 12 and to a second inverter voltage vector V (INV2) (voltage commands vd2 and vq2) for the second inverter 14. The distribution performed by the distribution unit 40 will be described later.

The voltage commands vd1 and vq1 from the distribution unit 40 are supplied to a two-phase to three-phase conversion unit 42 in which those commands are converted into three-phase voltage commands Vu1, Vv1, and Vw1 for the first inverter 12 and from which those commands are output. The voltage commands vd2 and vq2 are supplied to a two-phase to three-phase conversion unit 44 in which those commands are converted into three-phase voltage commands Vu2, Vv2, and Vw2 for the second inverter 14 and from which those commands are output. Note that the current command generation unit 34, the three-phase to two-phase conversion unit 36, the P1 control unit 38, the distribution unit 40, and the two-phase to three-phase conversion units 42 and 44 are included in the motor control block 32.

The three-phase voltage commands Vu1, Vv1, and Vw1 for the first inverter 12 from the two-phase to three-phase conversion unit 42 are supplied to a first inverter control unit 46, and the three-phase voltage commands Vu2, Vv2, and Vw2 for the second inverter 14 are supplied to a second inverter control unit 48. The first inverter control unit 46 receives the rotor rotating angle θ and the first inverter input voltage VH1 and produces switching signals for turning on or off the switching elements of the first inverter 12 based on a comparison of a PWM carrier (for example, triangular wave) with the voltage commands Vu1, Vv1, and Vw1. The first inverter control unit 46 then supplies the switching signals to the first inverter 12. Similarly, the second inverter control unit 48 produces switching signals for turning on or off the switching elements in the second inverter 14 and supplies the switching signals to the second inverter 14.

In this manner, the switching of the first inverter 12 and the second inverter 14 is controlled by the signals from the control unit 24. Accordingly, outputs from the first inverter 12 and the second inverter 14 are added up, causing a flow of a desired current to the motor 10.

"Switching Waveform"

FIGS. 3A and 3B illustrates the production of switching signals in the first inverter control unit 46 and the second inverter control unit 48. In the example illustrated in FIG. 3A, the upper part of the diagram illustrates a comparison of the triangular wave with the voltage command Vu1 for a high-side u-phase switching element of the first inverter 12, and the lower part of the diagram illustrates a switching waveform obtained by the comparison result. FIG. 3B relates to a low-side u-phase switching element of the second inverter 14, and a waveform illustrated in FIG. 3B is equal to that in FIG. 3A. Due to such a switching operation, a current flows from the high-side u-phase switching element of the first inverter 12 to the low-side u-phase switching element of the second inverter 14 through the u-phase coil 10u of the motor 10. Switching waveforms of a low-side u-phase switching element of the first inverter 12 and a high-side u-phase switching element of the second inverter 14 are basically the inversion of the waveforms illustrated in FIGS. 3A and 3B. The switching operations for the first inverter 12 and the second inverter 14 are controlled in such a manner that currents having phases different from each other by 120 degrees flow through the u-phase coil 10u, the v-phase coil 10v, and the w-phase coil 10w of the motor 10. In this example, there is a period in which a voltage command continuously exceeds the triangular wave, and this period causes overmodulation PWM control.

"Motor Voltage and Current"

Figure 4A:
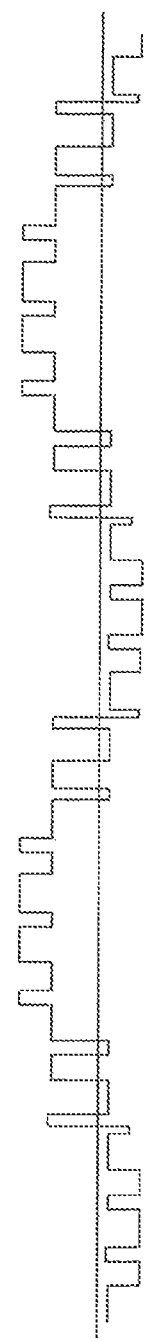
FIG. 4A is a diagram illustrating an applied voltage with respect to one phase of a motor and a waveform of a corresponding current.
Figure 4B:
FIG. 4B is a diagram illustrating an applied voltage with respect to one phase of the motor and a waveform of a corresponding current.

FIG. 4A illustrates an applied voltage with respect to one phase (one phase coil) of the motor 10, and FIG. 4B illustrates a motor current (phase current). A voltage applied to each phase of the motor 10 is formed from an induced voltage (back electromotive voltage) generated by the motor 10, and output voltages of the first inverter 12 and the second inverter 14 (voltages output by turning on or off the switching elements). In other words, the switching elements of the first inverter 12 and the second inverter 14 are turned on or off by switching signals as illustrated in FIGS. 3A and 3B, and a voltage in one direction for a current flowing from the first inverter 12 to the second inverter 14 is applied to one phase of the motor 10. Since a phase current depends on a voltage to be applied, application of a voltage (phase voltage) as illustrated in FIG. 4A causes a phase current as illustrated in FIG. 4B to flow in one phase of the motor 10.

The shape and ripples of a phase current depend on a voltage to be applied. For example, a PWM controlled carrier (triangular wave) at a low frequency causes large ripples.

"Distribution of Outputs in Two Inverters"

The distribution unit 40 in FIG. 2 distributes the motor voltage vector V to the first and the second inverter voltage vectors V (INV1) and V (INV2) at any ratio based on, for example, various kinds of information (information for distribution) supplied from the vehicle control unit 30 which is a higher-order control unit and based on inverter information that indicates operating states of the first inverter 12 and the second inverter 14. While a motor voltage vector is maintained, the motor voltage vector is distributed to two inverter voltage vectors. Accordingly, this distribution at any ratio involves changes of the motor voltage vector in magnitude, phase, and positive/negative directions.

<Changes in Distribution Ratio of Output>

Figure 5A:
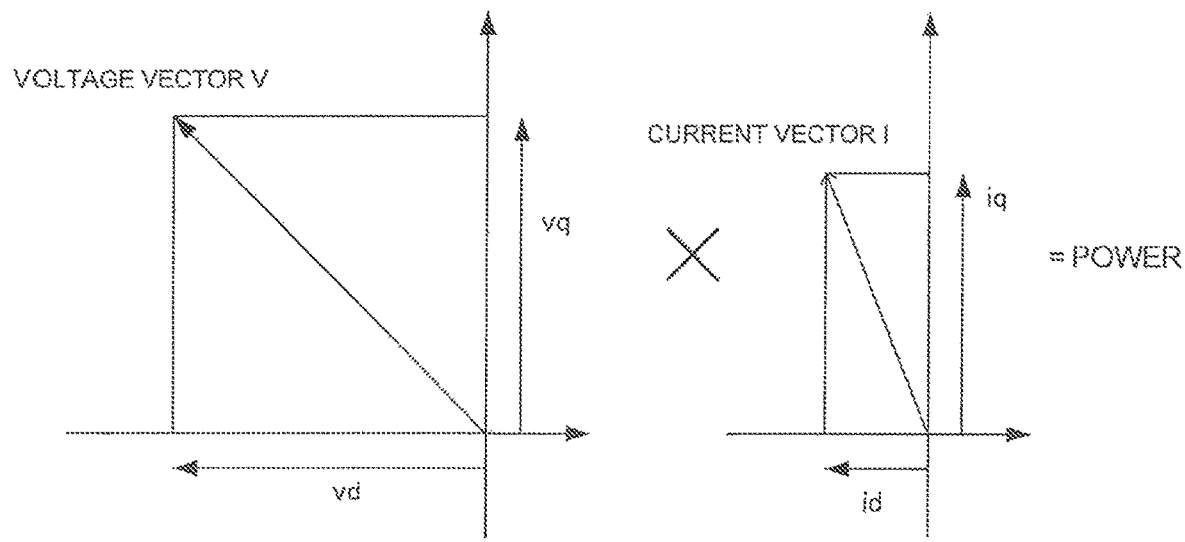
FIG. 5A illustrates distribution of a voltage vector in a case of using one inverter.

FIG. 5A illustrates vector control of a voltage and a current, using one inverter in normal motor drive. The motor voltage vector V (d-axis voltage vd and q-axis voltage vq) and a motor current vector I (d-axis current id and q-axis current iq) are determined according to an output request for the motor 10. The motor voltage×the motor current produces an output (power).

Figure 5B:
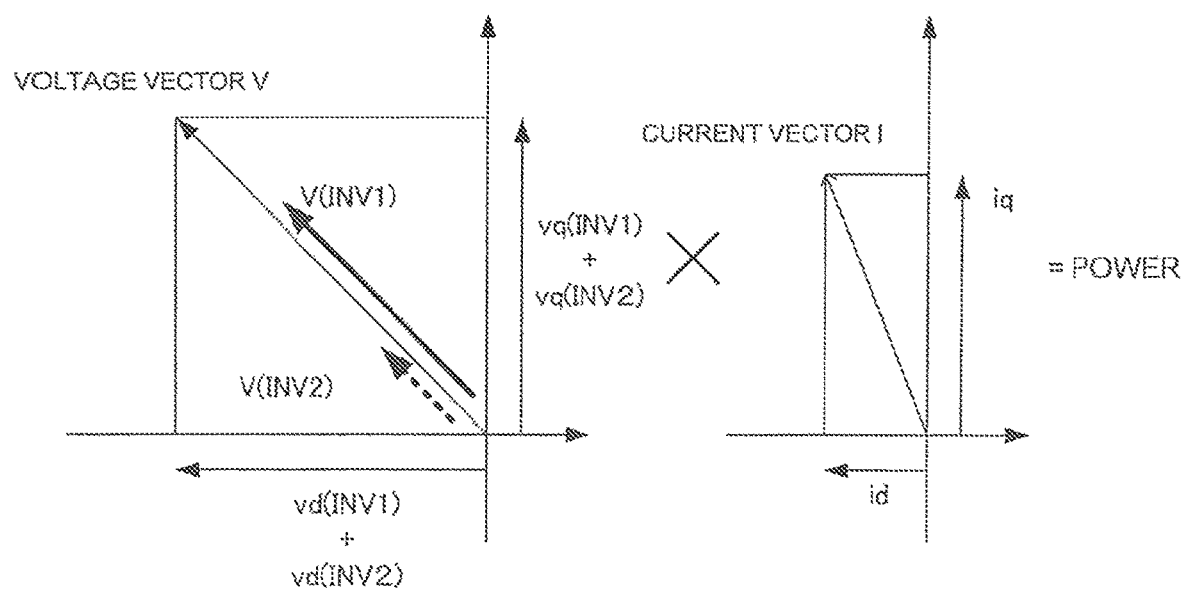
FIG. 5B illustrates distribution of a voltage vector in a case where two inverters have voltage vectors of different magnitude.

The motor system in this embodiment includes two inverters, the first inverter 12 and the second inverter 14. Herein, outputs from the two inverters may be made unequal. In FIG. 5B, the voltage vector V (INV1) of an output from the first inverter 12 (first inverter voltage vector) and the voltage vector V (INV2) of an output from the second inverter 14 (second inverter voltage vector) are changed in magnitude but not in phase. This case does not vary the output (power) from the motor 10 but varies the shape (waveform) of the switching signals in the first inverter 12 and the second inverter 14. Provided that d-axis components of the outputs from the first inverter 12 and the second inverter 14 are vd (INV 1) and vd (INV 2), the d-axis components vd=vd (INV 1)+vd (INV 2), and the q-axis components vq=vq (INV1)+vq (INV2).

Figure 6A:
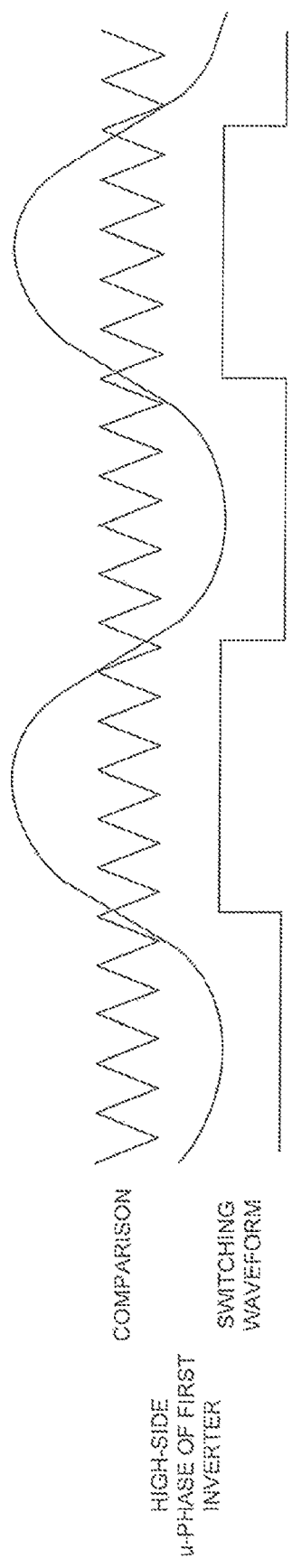
FIG. 6A is a diagram illustrating a switching waveform (at a 60:40 distribution ratio) of the high-side switching element of the first inverter.
Figure 6B:
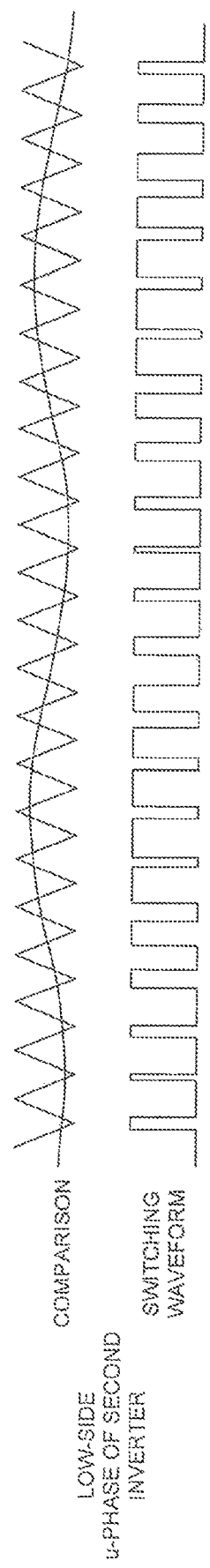
FIG. 6B is a diagram illustrating a switching waveform (at a 60:40 distribution ratio) of the low-side switching element of the second inverter.

FIGS. 6A and 6B illustrate a waveform of the switching signals when the distribution ratio of power is 60:40 in FIG. 5B. FIG. 6A shows 60%, and FIG. 6B shows 40%. In this example, the voltage command is large, causing square wave control in FIG. 6A. In FIG. 6B, the number of switching operations is larger.

Changing a distribution ratio while maintaining the phases of the voltage vectors V (INV1) and V (INV2), or two inverter outputs, as illustrated in FIG. 5B varies the waveform of the switching signals as illustrated in FIGS. 6A and 6B. This leads to variations in shape of a phase voltage with respect to the motor 10, causing an increase or a decrease in number of switching operations and variations in pulse width.

Furthermore, the outputs and losses in the first inverter 12 and the second inverter 14 vary, and heat generated in the first inverter 12 and the second inverter 14 also vary. Moreover, the variations in shape of the phase voltage lead to variations in shape of the phase current, causing variations in sound to be generated as well as in battery current.

In this manner, as the motor voltage vector V is distributed to the voltage vector V (INV1) of the first inverter 12 and the voltage vector V (INV2) of the second inverter 14 at any ratio, it is possible to meet requirements for the system.

"Advantages and Disadvantages in Mode of Operation"

There are three modes of operation in an inverter: PWM (sine wave PWM) mode, overmodulation (overmodulation PWM) mode, and square wave mode. In a comparison of a voltage command with a carrier (triangular wave) as illustrated in FIGS. 3A and 3B, a maximum value of the voltage command is not greater than a maximum value of the triangular wave in PWM mode, the maximum value of the voltage command is partially greater than the maximum value of the triangular wave in overmodulation mode, and the maximum value of the voltage command is sufficiently greater than the maximum value of the triangular wave in square wave mode. Specifically, with respect to an inverter input voltage (battery voltage in this example), when an inverter output voltage (control voltage) is less than 0.7, the inverter is in PWM mode; when an inverter output voltage (control voltage) is 0.7 or more and less than 0.78, the inverter is in overmodulation mode; and when an inverter output voltage is 0.78, the inverter is in square wave mode.

Table 1 summarizes the modes of operation and characteristics of each mode.

situations, the greater the increase in the number of switching operations, the greater the decrease in noise. Accordingly, there is less noise in PWM mode, and more noise in overmodulation mode and square wave mode.

In addition, a small current ripples causes a small change in magnetic field other than the fundamental wave due to the current ripples. This easily reduces iron loss in the motor and reduces an amount of heat generation in the motor. Accordingly, the amount of motor heat generation is small in PWM mode in which the number of switching operations is large and the current ripples is small, and the amount of motor heat generation is large in overmodulation mode and square wave mode.

TABLE 1

| | ADVANTAGES IN A CASE WHERE NUMBER OF SWITCHING OPERATIONS IS LARGE | | | ADVANTAGES IN A CASE WHERE NUMBER OF SWITCHING OPERATIONS IS SMALL | |
|---|---|---|---|---|---|
| | INCREASE IN NUMBER OF CONTROLLING OPERATIONS | REDUCTION IN CURRENT RIPPLES | | REDUCTION IN INVERTOR LOSSES | |
| | EXCELLENT CONTROLLABILITY | REDUCTION IN NOISE | REDUCTION IN MOTOR HEAT | ENHANCEMENT IN POWER EFFICIENCY | REDUCTION IN INVERTER HEAT |
| PWM | ⊚ | ⊚ | ⊚ | Δ | Δ |
| OVERMODULATION | ○ | Δ | ○ | ○ | ○ |
| SQUARE WAVE | Δ | Δ | Δ | ⊚ | ⊚ |

⊚ EXCELLENT
○ FAIR
Δ POOR

First, considering the number of switching operations, in square wave control, switching is performed at every 60 degrees in three phases. Accordingly, the number of switching operations is smaller than that in overmodulation control. In overmodulation control, switching operations as PWM are not performed partially. Therefore, the number of switching operations is smaller than that in PWM control in which switching is performed at each carrier cycle.

In regard to controllability (followability) with respect to an output request for a motor, the greater the increase in the number of switching operations, the greater the increase in the number of controlling operations, causing excellent controllability. Accordingly, controllability is best in PWM, the next best in overmodulation mode, and worst in square wave mode.

At an equal electric frequency, a small number of switching operations extends each ON and OFF periods in a cycle. Accordingly, current ripples become large. Therefore, in order to reduce current ripples, the number of switching operations should be large.

A magnitude of current ripples reduces frequency components other than a fundamental wave included in a current waveform. This reduces electromagnetic force of a motor and reduces noise of the motor. In other words, the greater the increase in the number of switching operations increases, the greater the decrease in noise. Furthermore, as the number of switching operations becomes smaller, the carrier frequency coupled to the electric frequency (f: frequency of fundamental wave) is selected. In other words, the carrier frequency becomes f×6 in square wave mode and becomes f×synchronization number (multiples of 3) in overmodulation mode. Accordingly, free selection of carriers is not allowed or it is limited. Therefore, noise is generated in a region depending on the electric frequency. Under such On the other hand, when the number of switching operations is small, the number of times when switching loss occurs is reduced. This makes it possible to reduce loss in an inverter and prevent heat generation in the inverter. Accordingly, power efficiency and inverter heat generation are best in square wave control, the next best in overmodulation control, and worst in PWM control.

"Control Mode of Operation"

Appropriate mode depending on the situation of the system may be selected according to advantages and disadvantages of each mode as described above. In this embodiment, distribution ratios in outputs of two inverters, the first inverter 12 and the second inverter 14, are changed to enable control of the modes of operation in motor drive.

As described above, by controlling output voltages (control voltages) of the first inverter 12 and the second inverter 14 for outputting a desired motor voltage vector, it is possible to select a mode of operation of the motor 10 depending on the situation at that time. Specifically, control voltages in outputs of the first inverter 12 and the second inverter 14 are limited so as to achieve, for example, prevention of noise, prevention of an increase in motor temperature, and maintenance of controllability. Note that the "control voltage" is defined as the magnitude of a voltage required to produce torque corresponding to the motor voltage vector.

<Flow of Limiting Mode of Operation>

Figure 7:
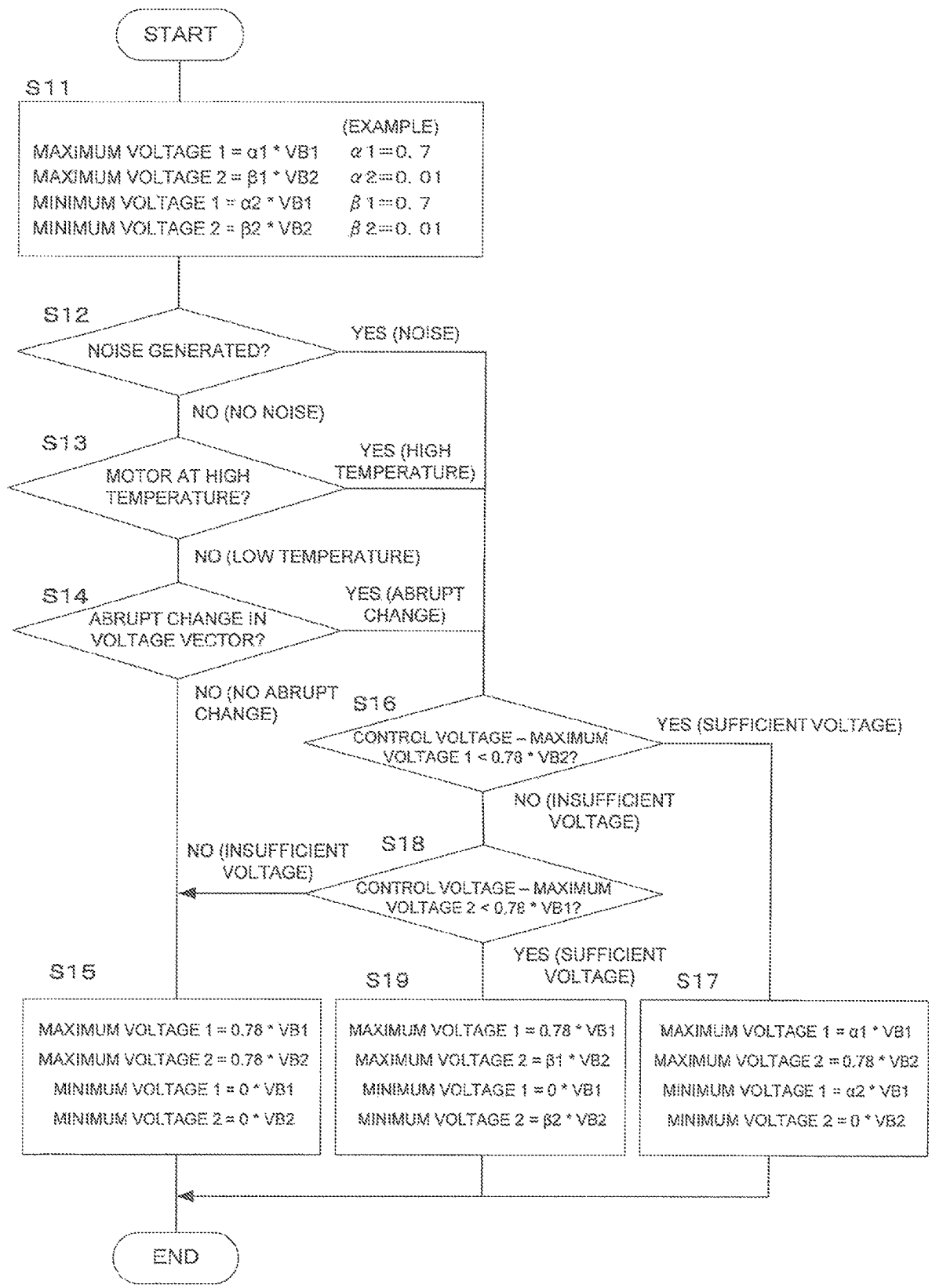
FIG. 7 is a flowchart illustrating an operation of limiting a mode of operation to PWM mode.

FIG. 7 illustrates a flowchart of an operation for preventing noise, motor heat generation, and the like by limiting control voltages.

The first step is to set a maximum voltage and a minimum voltage in output voltages (control voltages) of the first inverter 12 and the second inverter 14 (S11).

Maximum voltage 1 (maximum control voltage of first inverter 12): $\alpha 1 * VB1$ Maximum voltage 2 (maximum control voltage of second inverter 14): β1*VB2

Minimum voltage 1 (minimum control voltage of first inverter 12): α2*VB1

Minimum voltage 2 (minimum control voltage of second inverter 14): β2*VB2

Herein, VB1 and VB2 are battery voltages of the first battery 18 and the second battery 22, respectively. The coefficients α1, α2, β1, and β2 may be obtained by experiment or by calculation. For example, α1=0.7, α2=0.01, β1=0.7, and β2=0.01. In this manner, limiting the coefficient of the maximum voltage to 0.7 limits a mode of operation to PWM mode. Furthermore, when the minimum voltage is 0, a switching signal (PWM signal) with a duty cycle of 50% is output at that time, and switching of three phases becomes equal. This reduces the above-described advantage of PWM to increase the number of switching operations. Setting the minimum voltage not to 0 but to 0.01 maintains the advantage of PWM. Although the minimum voltage is intentionally set not to 0, a voltage applied to a motor coil should be substantially 0.

After setting maximum and minimum voltages in S11, a determination is made as to whether noise is generated (S12). Determination may be performed, for example, with a noise meter installed in a vehicle or a vibration meter installed in the motor 10.

If the result of the determination is NO in S12, which indicates that there is no noise, a determination is made as to whether the motor temperature is high (S13). Determination may be performed by measuring the temperature with a motor temperature sensor 10*a* attached to the motor 10. In some embodiments, the motor 10 is at a high temperature when the temperature of the motor 10 is equal to or higher than a motor temperature threshold, and the motor 10 is at a normal temperature when the temperature of the motor 10 is less than the motor temperature threshold.

If the result of the determination is NO in SI 13, which indicates that the temperature is not high, a determination is made as to whether the motor voltage vector is changing abruptly (S14).

If the result of the determination is NO in S14, there is no need to limit drive of the motor 10. The next step is to set the maximum voltage and the minimum voltage in the output voltages (control voltages) of the first inverter 12 and the second inverter 14 as follows (S15).

Maximum voltage 1: 0.78*VB1
Maximum voltage 2: 0.78*VB2
Minimum voltage 1: 0*VB1
Minimum voltage 2: 0*VB2

Accordingly, it is possible to run the vehicle in any mode of operation: PWM, overmodulation, or square wave mode.

If the result of the determination is YES in S12, noise prevention is required, and if the result of the determination is YES in S13, reduction in motor temperature is required.

Furthermore, if the result of the determination is YES in S14, the voltage command fluctuates, which requires a quick response to the fluctuation.

Accordingly, if the results of the determination are YES in any of S12, S13, and S14, PWM mode would be selected. For this reason, a determination is made as to whether control voltage−maximum voltage 1<0.78*VB2 (S16). In other words, a determination is made as to whether a voltage obtained by subtracting the maximum voltage 1 of the output of the first inverter 12 (voltage for operating the first inverter 12 in PWM mode) from the control voltage required for driving the motor 10 (the resulting voltage is a voltage required for an output of the second inverter 14) is smaller than 0.78 times the voltage of the second battery 22 (voltage which is output from the second inverter 14). If the result of the determination is YES, even though the first inverter 12 is limited to PWM mode, operating the second inverter 14 in one of PWM, overmodulation, and square wave mode makes it possible to satisfy an output request for the motor 10 (sufficient voltage).

If the result of the determination is YES in S16, the maximum voltage and the minimum voltage are set as follows (S17).

Maximum voltage 1=α1*VB1
Maximum voltage 2=0.78*VB2
Minimum voltage 1=α2*VB1
Minimum voltage 2=0*VB2

Accordingly, the mode of operation of the first inverter 12 is limited to PWM, and the second inverter 14 operates without limitation.

If the result of the determination is NO in S16, the voltage is insufficient, and the mode of operation of the first inverter 12 is not limited to PWM. Therefore, a determination is made as to whether control voltage−maximum voltage 2<0.78*VB1 (S18). This is to determine whether it is possible to obtain a motor drive voltage (sufficient voltage) when the mode of operation of the second inverter 14 is limited to PWM mode. If the result of the determination is YES in S18, even though the mode of operation of the second inverter 14 is limited to PWM mode, since the output request for the motor 10 is satisfied, the maximum voltage and the minimum voltage are set as follows (S19).

Maximum voltage 1=0.78*VB1
Maximum voltage 2=β1*VB2
Minimum voltage 1=0*VB1
Minimum voltage 2=β2*VB2

Accordingly, the mode of operation of the second inverter 14 is limited to PWM, and the first inverter 12 operates without limitation.

If the result of the determination is NO in step S18, no matter which of the first inverter 12 and the second inverter 14 is limited to PWM mode, the output request for the motor 10 is not satisfied. Therefore, the process proceeds to S15, and both the first inverter 12 and the second inverter 14 are operated without being limited to PWM mode.

As described above, in this embodiment, in a case where the motor 10 is operated according to an output request, the operations of the first inverter 12 and the second inverter 14 are limited to PWM mode. Accordingly, it is possible to prevent noise and heat generation caused by the motor 10 and to enhance controllability.

In the above example, α1 and β1 are set to 0.7 and the mode of operation is limited to PWM mode. However, α1 and β1 may be set to a range, for example, between 0.77 and 0.78 (for example, 0.74) to allow overmodulation mode.

<S12: Noise>

In prevention of noise, regions with noisy sounds are determined in advance, as operating states of the motor 10 and the regions are stored as a map. In this case, on entering this region, the result of the determination becomes YES in S12. Setting in PWM mode makes it possible to improve noise characteristics.

An example of the map includes one illustrated in Table 2. Based on this map, as the operating state of the motor 10, when the output torque falls within a range from 10 to 30 Nm and the rotative speed falls within a range from 2000 to 3000 rpm, a determination is made that noise is generated.

TABLE 2

| TORQUE [Nm] | 1000 | 2000 | 3000 | 4000 | 5000 | 6000 | 7000 ROTATIVE SPEED [rpm] |
|---|---|---|---|---|---|---|---|
| 100 | 0 | 0 | 0 | 0 | 0 | 0 | 0 |
| ... | 0 | 0 | 0 | 0 | 0 | 0 | 0 |
| 50 | 0 | 0 | 0 | 0 | 0 | 0 | 0 |
| 40 | 0 | 0 | 0 | 0 | 0 | 0 | 0 |
| 30 | 0 | 1 | 1 | 0 | 0 | 0 | 0 |
| 20 | 0 | 1 | 1 | 0 | 0 | 0 | 0 |
| 10 | 0 | 1 | 1 | 0 | 0 | 0 | 0 |
| 0 | | | | | | | |

<S13: Motor Temperature>

At a high motor temperature, the less the current ripples, the greater the reduction in iron loss (eddy current loss). Accordingly, it is possible to prevent heat generation. For this reason, PWM mode is selected. An example of the motor temperature includes a measured stator temperature. Furthermore, a rotor temperature may be estimated from the operating state or the like.

<Abrupt Change of Voltage Vector>

If the result of the determination is YES in S14; that is, when there is a situation where the motor voltage vector is changing abruptly, a vehicle is considered to be in one of the following situations, for example, (i) slipping or gripping, (ii) running at a high rate of acceleration (large powering), or (iii) running in deceleration mode (large regeneration) using a brake. Under these situations, the voltage command fluctuates, which requires a quick response to the fluctuation. Accordingly, PWM mode is selected.

"Flow of Inverter Temperature Suppression"

Figure 8:
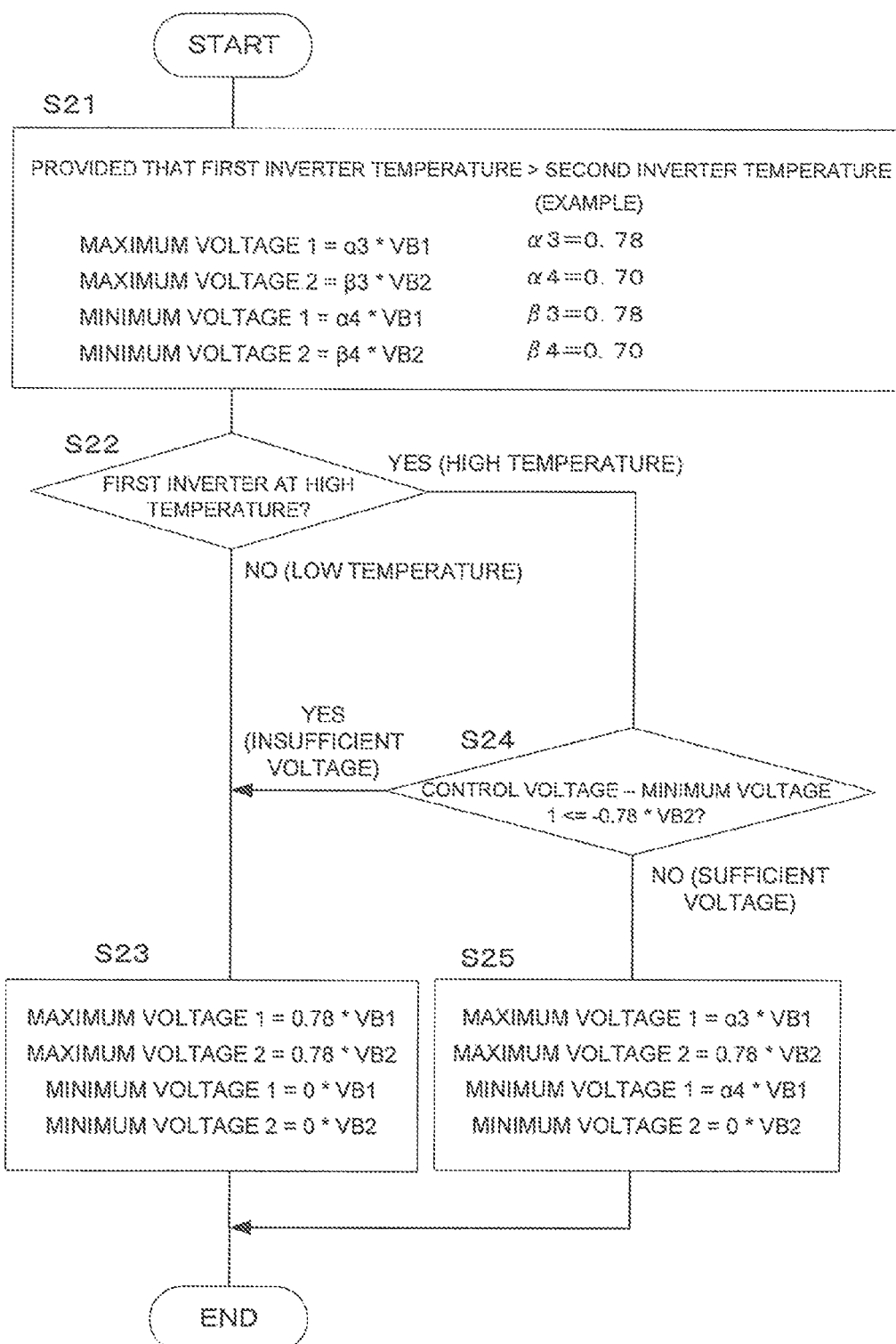
FIG. 8 is a flowchart illustrating an operation of limiting a mode of operation to square wave mode.

FIG. 8 illustrates a flow for preventing heat generation when the first inverter 12 is at a high temperature.

The first step is to set a maximum voltage and a minimum voltage in the output voltages (control voltages) of the first inverter 12 and the second inverter 14 (S21).

Maximum voltage 1: $\alpha 3 * VB1$
Maximum voltage 2: $\beta 3 * VB2$
Minimum voltage 1: $\alpha 4 * VB1$
Minimum voltage 2: $\beta 4 * VB2$ Herein, for example, $\alpha 3 = 0.78$, $\alpha 4 = 0.70$, $\beta 3 = 0.78$, and $\beta 4 = 0.70$. With this setting, the mode of operation of the first inverter 12 is limited to overmodulation mode or square wave mode.

Next, a determination is made as to whether the first inverter 12 is at a high temperature (S22). Determination may be performed based on, for example, measurement results of an inverter or a first inverter temperature sensor 12a attached to the first inverter 12 and a second inverter temperature sensor 14a attached to the second inverter 14. In some embodiments, the first inverter 12 is at a high temperature when the temperature of the first inverter 12 is equal to or higher than an inverter temperature threshold, and the first inverter 12 is at a normal temperature when the temperature of the first inverter 12 is less than the inverter temperature threshold. In some embodiments, the second inverter 14 is at a high temperature when the temperature of the second inverter 14 is equal to or higher than the inverter temperature threshold, and the second inverter 14 is at a normal temperature when the temperature of the second inverter 14 is less than the inverter temperature threshold.

If the result of the determination is NO (low temperature) in S22, there is no problem. Accordingly, without particular limitation, the maximum voltage and the minimum voltage are set as follows (S23).

Maximum voltage 1=0.78*VB1
Maximum voltage 2=0.78*VB2
Minimum voltage 1=0*VB1
Minimum voltage 2=0*VB2

Accordingly, the first inverter 12 and the second inverter 14 are operated in PWM, overmodulation, or square wave mode according to an output request.

If the result of the determination is YES in S22, it is required to reduce an amount of heat generation in the first inverter 12. Accordingly, a determination is made as to whether control voltage−minimum voltage 1<=−0.78*VB2 (S24). This is to determine whether the output demand of the motor is satisfied by the output voltage of the second inverter 14 when the output voltage (control voltage) of the first inverter 12 is limited to the PWM maximum voltage of 0.7 VB1 or more. In other words, the minimum voltage of the second inverter 14 in regeneration mode is −0.78*VB2, and if (control voltage−minimum voltage 1) is higher than −0.78*VB2, the first inverter 12 is operated in overmodulation mode or in square wave mode.

Accordingly, if the result of the determination is NO in S24, the first inverter 12 is limited to overmodulation mode or square wave mode, and the maximum voltage and the minimum voltage are set as follows (S25).

Maximum voltage 1=$\alpha 3$*VB1
Maximum voltage 2=0.78*VB2
Minimum voltage 1=$\alpha 4$*VB1
Minimum voltage 2=0*VB2

Accordingly, the first inverter 12 is limited to overmodulation mode or square wave mode, and the second inverter 14 is operated without limitation.

On the other hand, if the result of the determination is YES in S24, the output from the second inverter 14 is insufficient. Accordingly, the mode of the first inverter 12 is not limited, and the process proceeds to S23.

In this manner, when the first inverter 12 is at a high temperature, it is possible to prevent heat generation in the first inverter 12 by limiting the first inverter 12 to the overmodulation mode or square wave mode. In a similar manner, when the second inverter 14 is at a high temperature, the mode of operation of the second inverter 14 may be limited to overmodulation mode or square wave mode. In addition, if possible, a mode of operation of an inverter in which heat generation is to be prevented may be limited to square wave mode. In this case, a determination is made as to whether (control voltage−0.78*VB1) is −0.78*VB2 or less. If the result of the determination is NO, the minimum voltage may be set to 0.78*VB1 and the mode of operation of the first inverter 12 be limited to square wave mode.

"Other Arrangement"

In the embodiment, modes of operation are limited by, for example, noise, a motor temperature, an abrupt change in voltage vector, and an inverter temperature. However, the modes of operation may be limited by other factors. Furthermore, if possible, both the first inverter 12 and the second inverter 14 may be limited to PWM mode.

In FIG. 2, the motor control block 32 is arranged differently from the vehicle control unit 30, which is a higher-order control unit. However, the vehicle control unit 30 may execute the functions of the motor control block 32. Furthermore, the motor control block 32 may include a lower-order microcomputer. Moreover, all or part of the motor control block 32 may include hardware.

The motor control block 32 may include a plurality of CPUs. In this case, the functions are divided so that each CPU executes each functions. In a case where the motor control block 32 includes the plurality of CPUs, each CPU may be configured to execute the entire processing.

In the embodiment, two power supplies and two inverters are used. However, a system may include three or more power supplies and three or more inverters, and a plurality of inverters may be controlled based on a total voltage.

Two inverters may be controlled by a system provided with two power supplies and two inverters based on a total voltage. Alternatively, two inverters may be controlled by two CPUs in a system provided with two power supplies and two inverters based on a total voltage. With such an arrangement, even when one CPU fails, it is possible to drive a motor by the other CPU.

The invention claimed is:

1. A motor system, comprising:
 a first inverter which converts direct current power from a first power supply into alternating current power, having PWM mode, overmodulation mode, and square wave mode as modes of operation;
 a second inverter which converts direct current power from a second power supply into alternating current power, having PWM mode, overmodulation mode, and square wave mode as modes of operation;
 a motor having a plurality of phase coils, the first inverter is connected to one end of each of the phase coils of the motor and the second inverter is connected to the other end of each of the phase coils of the motor, the motor is driven by the alternating current power from the first inverter and the alternating current power from the second inverter; and
 a control unit which configured to calculate a motor voltage vector including a corresponding excitation voltage command and a torque voltage command in response to an output request for the motor and distributes the motor voltage vector to a first inverter voltage vector and a second inverter voltage vector while maintaining the motor voltage vector obtained to control the modes of operation of the first inverter or the second inverter, the control unit determines whether or not the motor voltage vector is maintainable by a sum of the first inverter voltage vector and the second inverter voltage vector when a maximum voltage for limiting the mode of operation to the PWM mode is set for one of the first inverter voltage vector and the second inverter voltage vector and the other one of the first inverter voltage vector and the second inverter voltage vector, and, when the motor voltage vector is determined to be maintainable, the maximum voltage is set for one of the other one of the first inverter voltage vector and the second inverter voltage vector,
 wherein the first inverter voltage vector includes an excitation voltage command and a torque voltage command associated with an output from the first inverter, and the second inverter voltage vector includes an excitation voltage command and a torque voltage command associated with an output from the second inverter.

2. The motor system according to claim 1,
 wherein the control unit configured to limit one of the first inverter voltage vector and the second inverter voltage vector in magnitude to a predetermined value or less to limit a mode of operation of a target inverter.

3. The motor system according to claim 1,
 wherein, when noise is generated, the control unit configured to limit one of the first inverter voltage vector and the second inverter vector in magnitude to a predetermined value or less to limit a mode of operation of a target inverter to PWM mode.

4. The motor system according to claim 1,
 wherein, when the motor is at a high temperature, the control unit configured to limit one of the first inverter voltage vector and the second inverter voltage vector in magnitude to a predetermined value or less to limit a mode of operation of a target inverter to PWM mode.

5. The motor system according to claim 1,
 wherein, when the voltage vector changing greatly, the control unit configured to limit one of the first inverter voltage vector and the second inverter voltage vector in magnitude to a predetermined value or less to limit a mode of operation of a target inverter to PWM mode.

6. The motor system according to claim 1,
 wherein, when one of the first inverter and the second inverter is at a high temperature, the control unit configured to limit an inverter voltage vector of a high-temperature inverter in magnitude to a predetermined value or more to limit a mode of operation of a target inverter to overmodulation mode or square wave mode.

* * * * *